US012421765B2

(12) United States Patent
Savidge et al.

(10) Patent No.: US 12,421,765 B2
(45) Date of Patent: Sep. 23, 2025

(54) SYSTEM FOR LATCHING AND LOCKING AN AIRCRAFT DOOR

(71) Applicant: BOMBARDIER INC., Dorval (CA)

(72) Inventors: John Richard Savidge, Sooke (CA); Peter Lyver, Beaconsfield (CA); Jean-Philippe Demers, Verdun (CA); David Riviere, Laval (CA); Remi Crozier, Montréal (CA); Patrick Serres, Montréal (CA)

(73) Assignee: BOMBARDIER INC., Dorval (CA)

( * ) Notice: Subject to any disclaimer, the term of this patent is extended or adjusted under 35 U.S.C. 154(b) by 201 days.

(21) Appl. No.: 16/704,443

(22) Filed: Dec. 5, 2019

(65) Prior Publication Data
US 2020/0181948 A1 Jun. 11, 2020

Related U.S. Application Data

(60) Provisional application No. 62/776,730, filed on Dec. 7, 2018.

(51) Int. Cl.
*E05B 57/00* (2006.01)
*B64C 1/14* (2006.01)
*E05B 79/12* (2014.01)
*E05B 81/20* (2014.01)
*E05B 85/12* (2014.01)

(52) U.S. Cl.
CPC ............ *E05B 57/00* (2013.01); *B64C 1/1407* (2013.01); *B64C 1/143* (2013.01); *E05B 79/12* (2013.01); *E05B 81/20* (2013.01); *E05B 85/12* (2013.01)

(58) Field of Classification Search
CPC .. E05B 17/0025; E05B 17/0029; E05B 57/00; E05B 79/12; E05B 81/20; E05B 85/12; B64C 1/1407; B64C 1/1415; B64C 1/1423; B64C 1/143; Y10T 292/444; Y10T 292/57; Y10T 292/1047; Y10T 70/5372
See application file for complete search history.

(56) References Cited

U.S. PATENT DOCUMENTS

| | | | | |
|---|---|---|---|---|
| 3,213,962 A | * | 10/1965 | Clark, Jr. | ................ B64C 1/24 49/249 |
| 3,791,073 A | * | 2/1974 | Baker | ................ B64C 1/1407 49/249 |
| 4,473,201 A | * | 9/1984 | Barnes | ................ B64C 1/1415 292/216 |
| 4,944,473 A | | 7/1990 | Kallies et al. | |

(Continued)

Primary Examiner — Christine M Mills
Assistant Examiner — Faria F Ahmad
(74) Attorney, Agent, or Firm — NORTON ROSE FULBRIGHT CANADA LLP

(57) ABSTRACT

Systems for latching and locking an aircraft door and associated methods are disclosed. The system comprises a latch and a lock. The latch can be configurable between: a latched configuration where the latch interferes with a lift mechanism for causing lifting of the aircraft door to permit opening of the aircraft door; and an unlatched configuration where the lift mechanism is permitted to cause lifting of the aircraft door. The lock can be configurable between: a locked configuration where a configuration change of the latch from the latched configuration to the unlatched configuration is prevented; and an unlocked configuration where the configuration change of the latch from the latched configuration to the unlatched configuration is permitted.

13 Claims, 12 Drawing Sheets

(56) References Cited

U.S. PATENT DOCUMENTS

| | | | | |
|---|---|---|---|---|
| 5,031,863 | A * | 7/1991 | Noble | B64C 1/143 244/129.5 |
| 5,064,147 | A * | 11/1991 | Noble | B64C 1/143 244/129.5 |
| 5,156,359 | A * | 10/1992 | Noble | B64C 1/1407 244/129.4 |
| 5,305,969 | A * | 4/1994 | Odell | B64C 1/1407 244/129.5 |
| 5,337,977 | A * | 8/1994 | Fleming | B64C 1/1407 244/129.5 |
| 5,636,814 | A | 6/1997 | Rollert | |
| 5,823,473 | A * | 10/1998 | Odell | B64C 1/1415 244/129.5 |
| 5,931,415 | A * | 8/1999 | Lingard | B64C 1/143 244/129.5 |
| 6,457,674 | B2 * | 10/2002 | Erben | B64C 1/1407 244/129.4 |
| 8,201,777 | B2 * | 6/2012 | Wilson | B64C 1/1415 292/336.3 |
| 9,033,277 | B2 * | 5/2015 | Berthoud | B64C 1/1407 244/118.3 |
| 11,254,431 | B2 * | 2/2022 | Savidge | B64D 9/00 |
| 2003/0141415 | A1 * | 7/2003 | Leclerc | B64C 1/32 244/129.5 |
| 2008/0099605 | A1 * | 5/2008 | Yada | B64C 1/1407 244/118.3 |

* cited by examiner

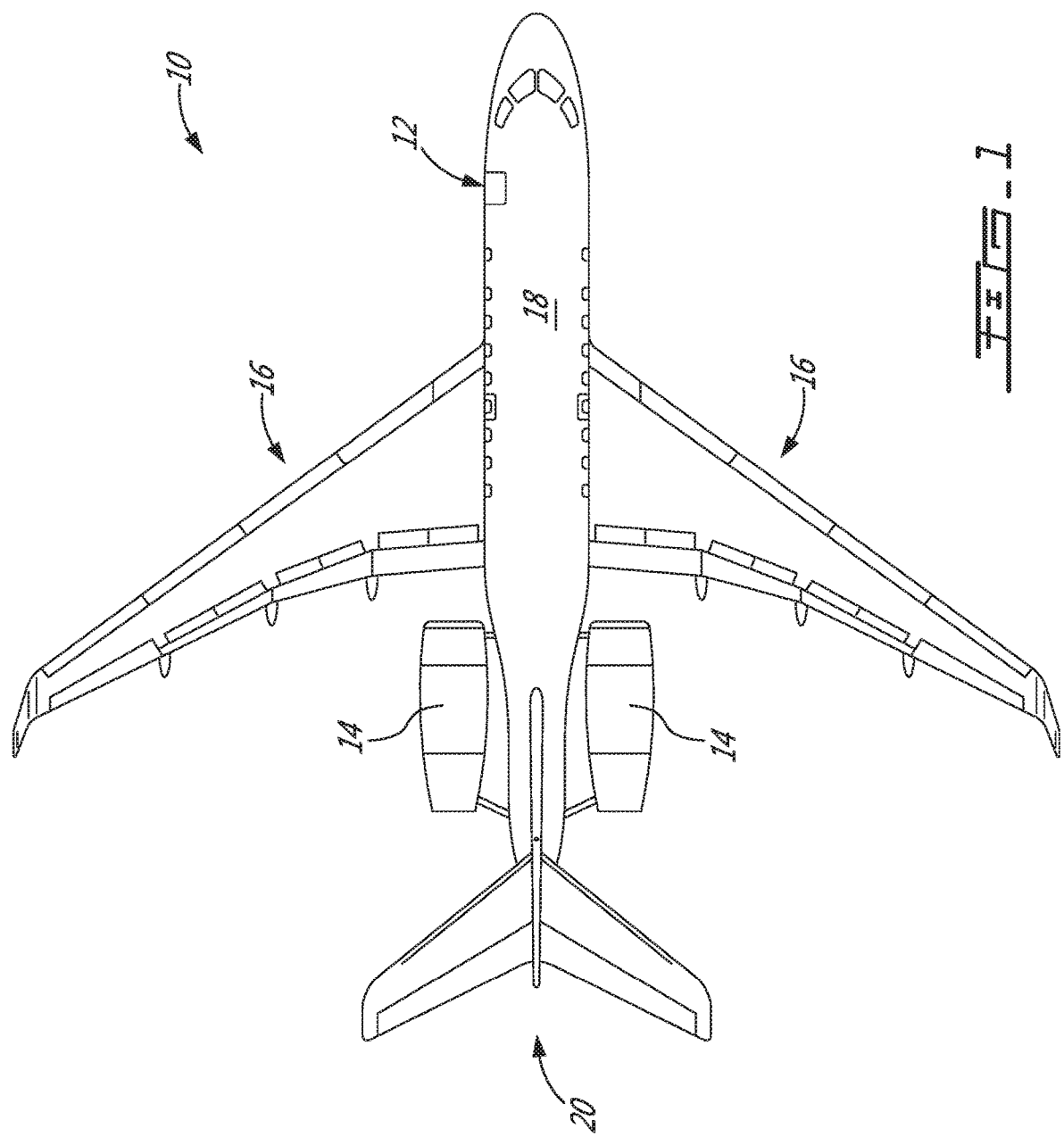

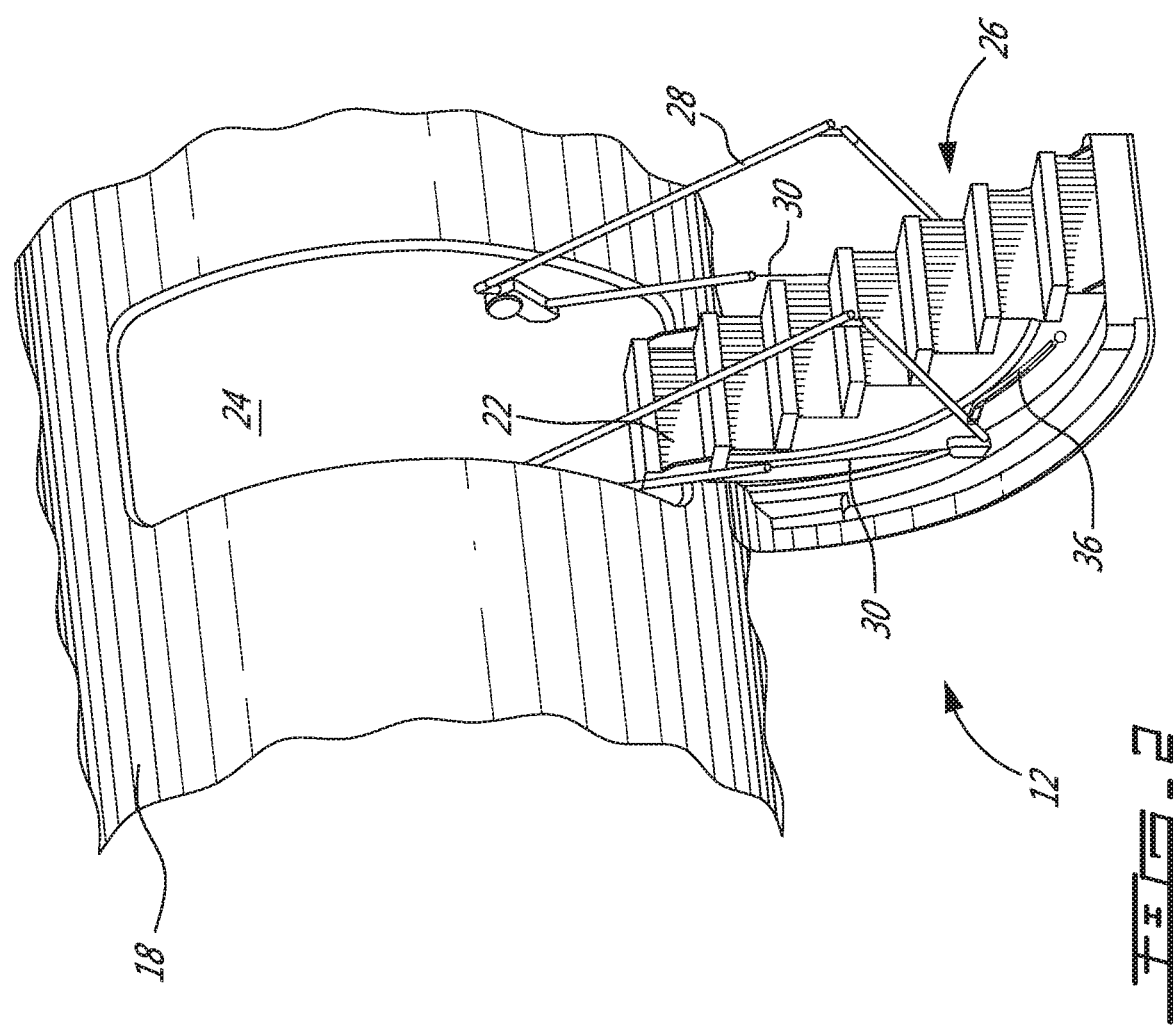

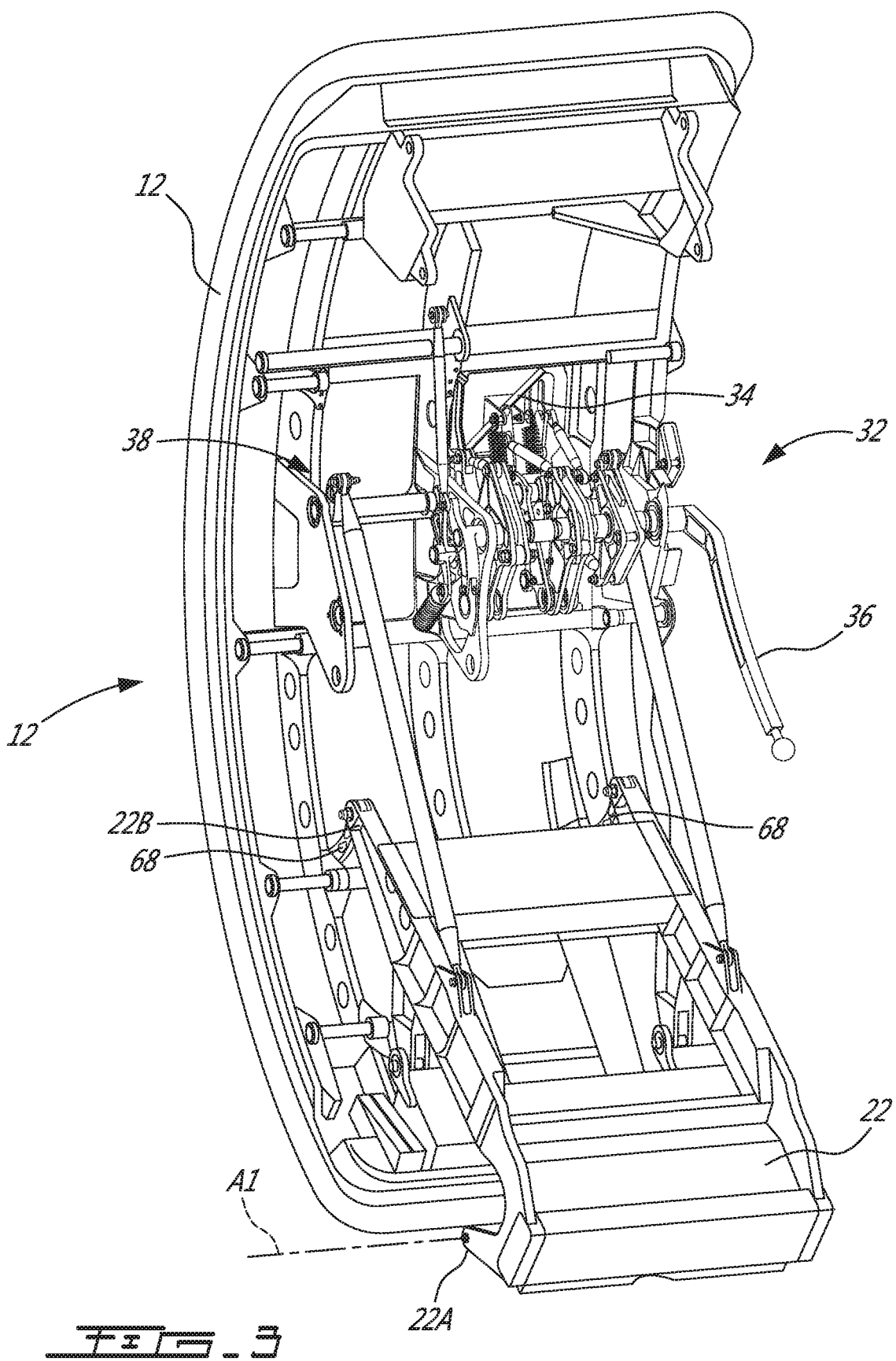

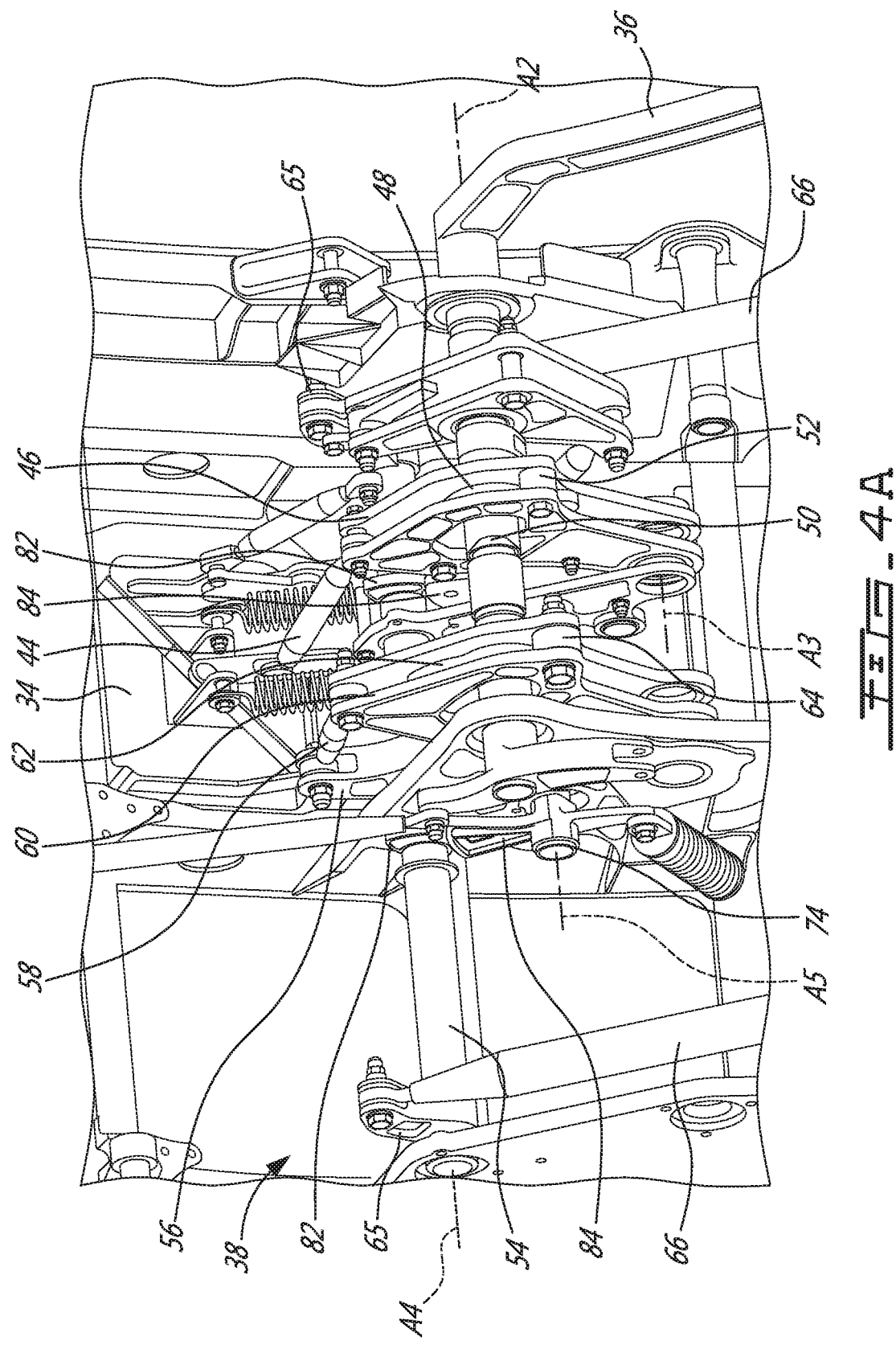

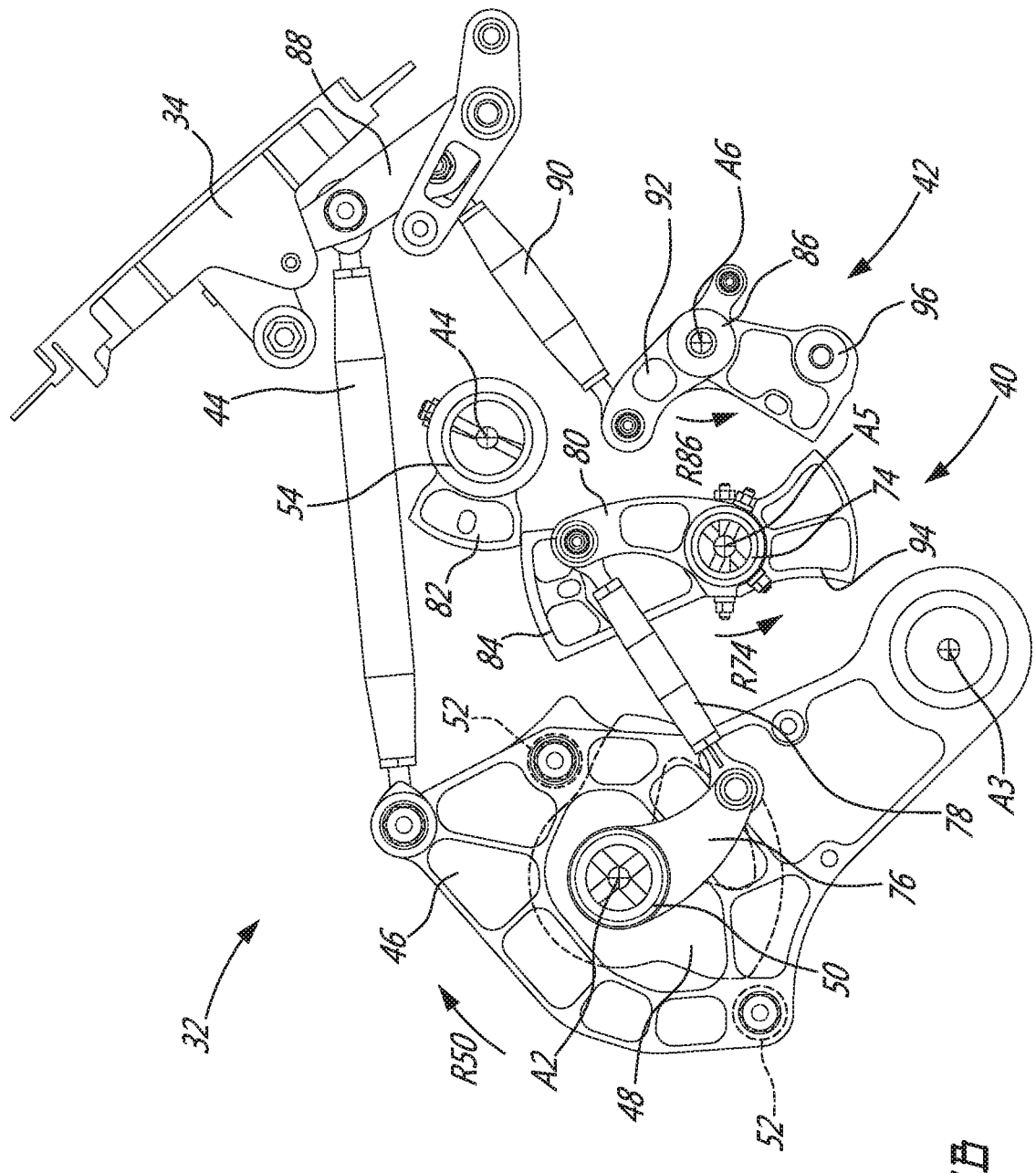

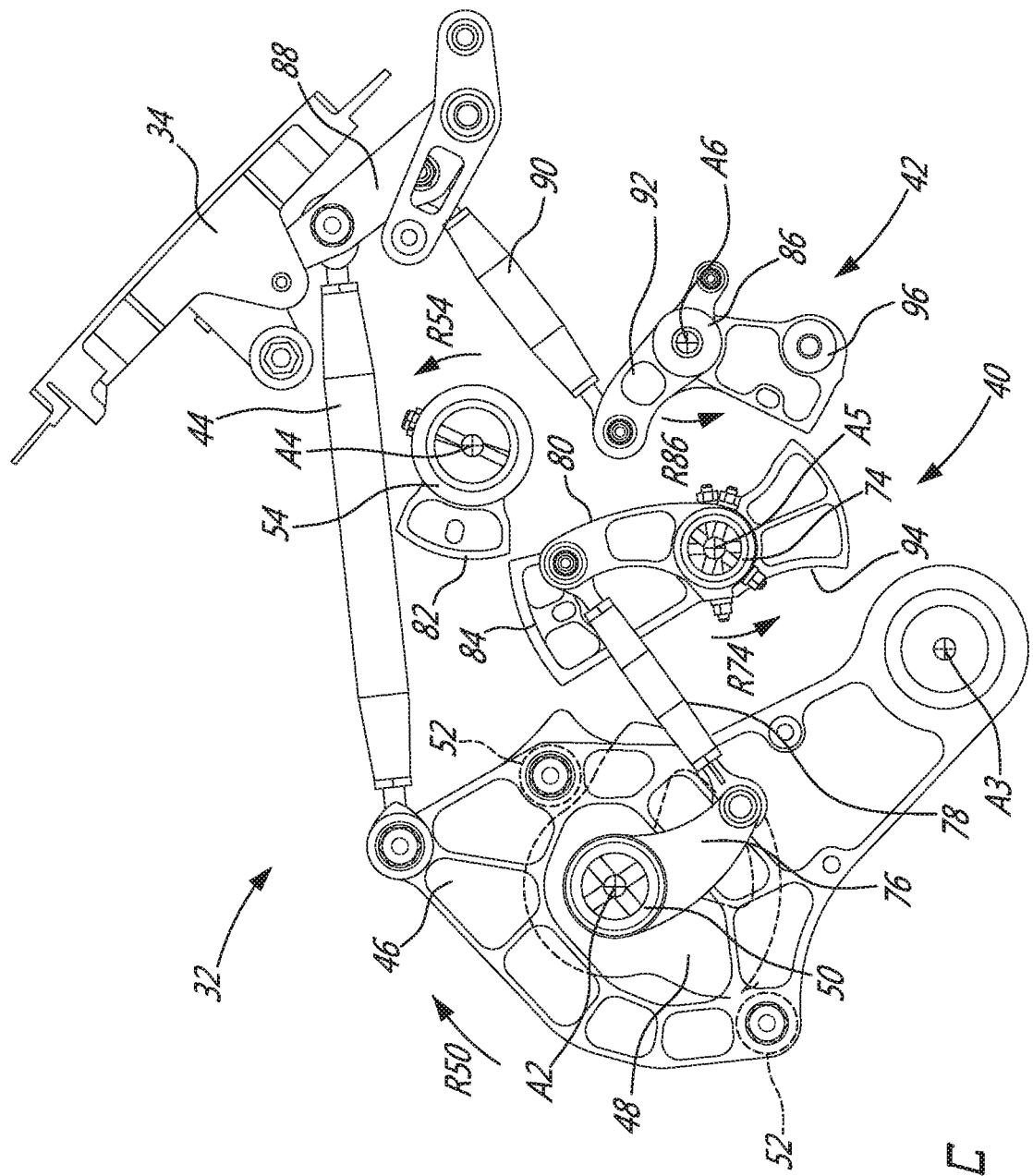

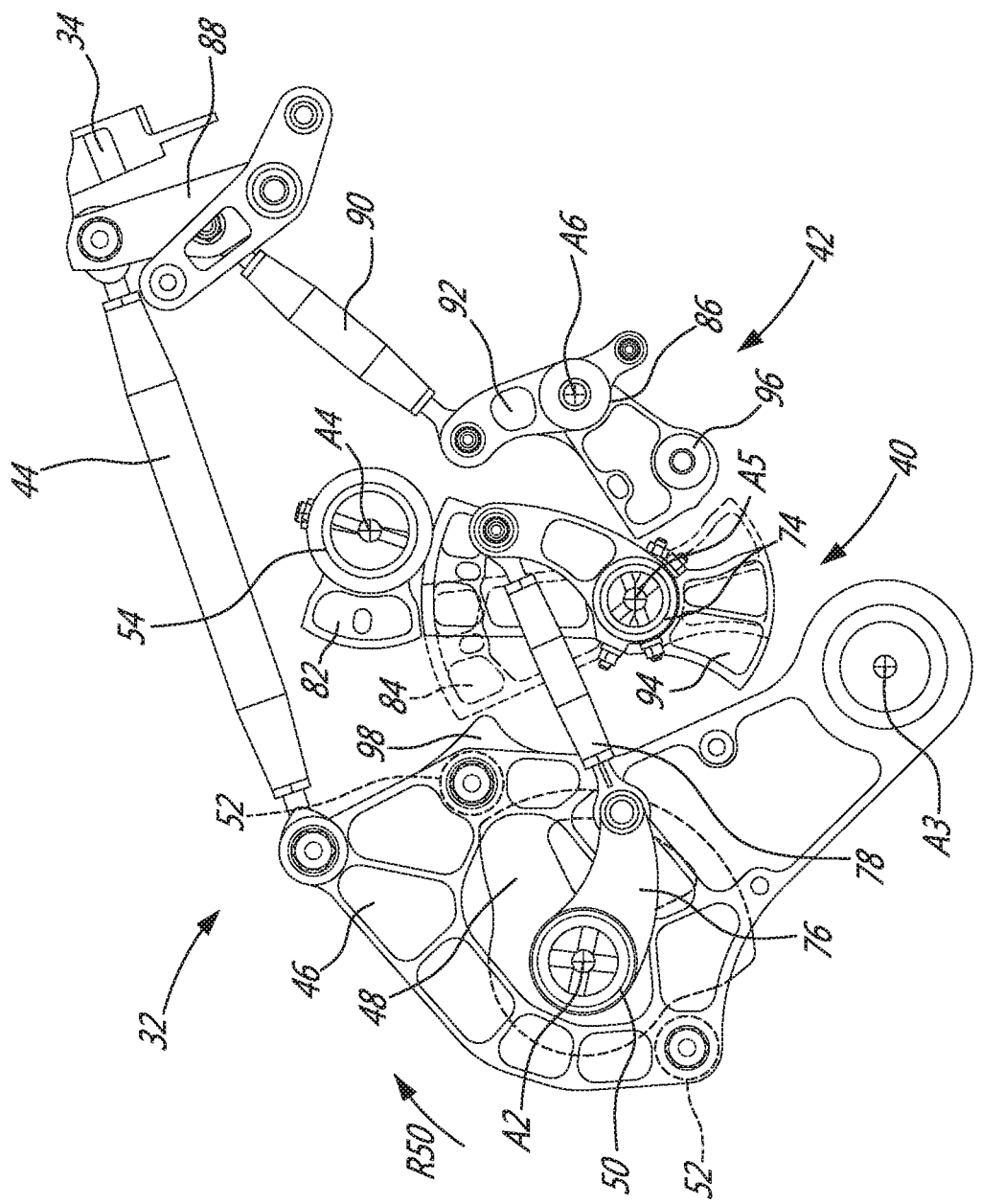

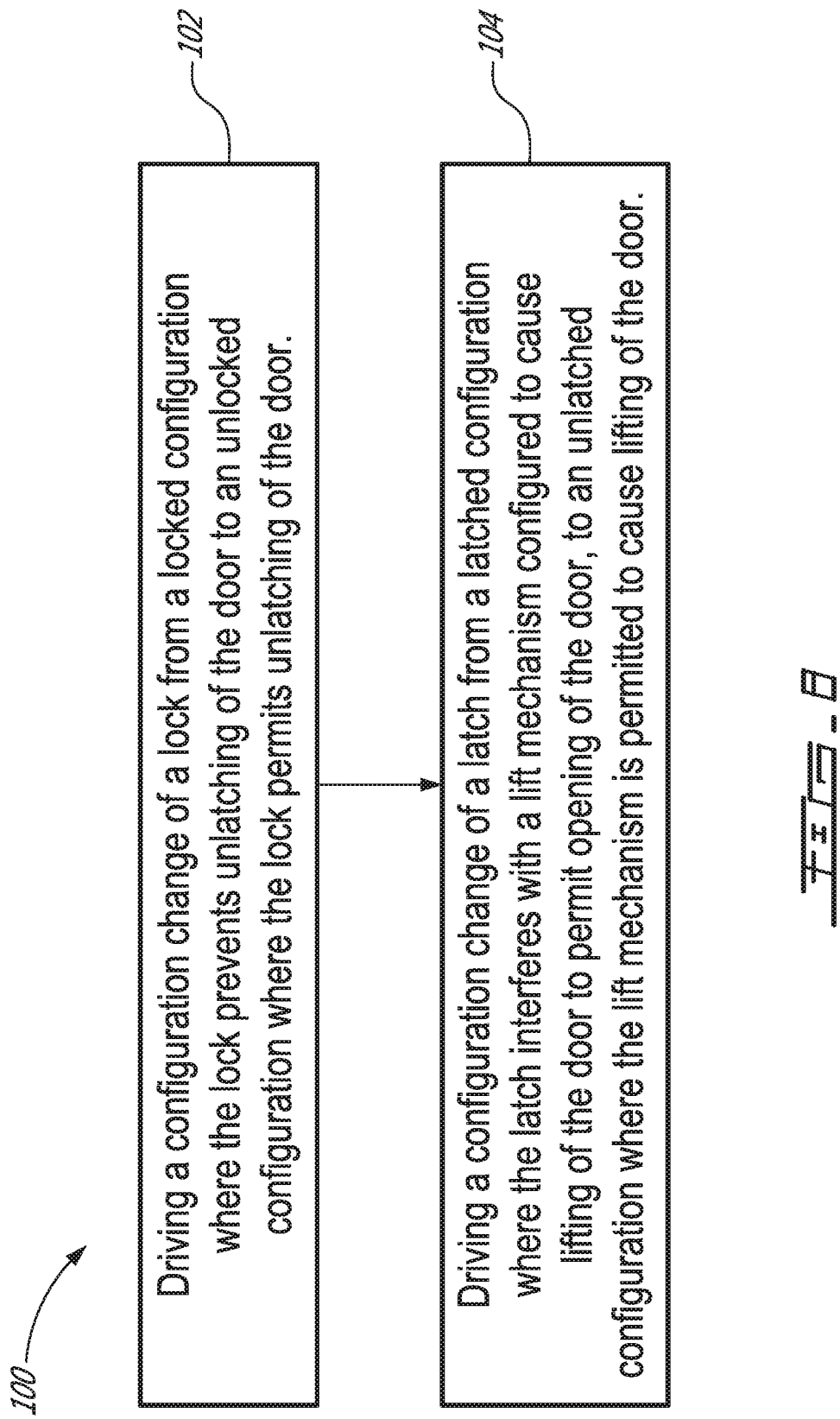

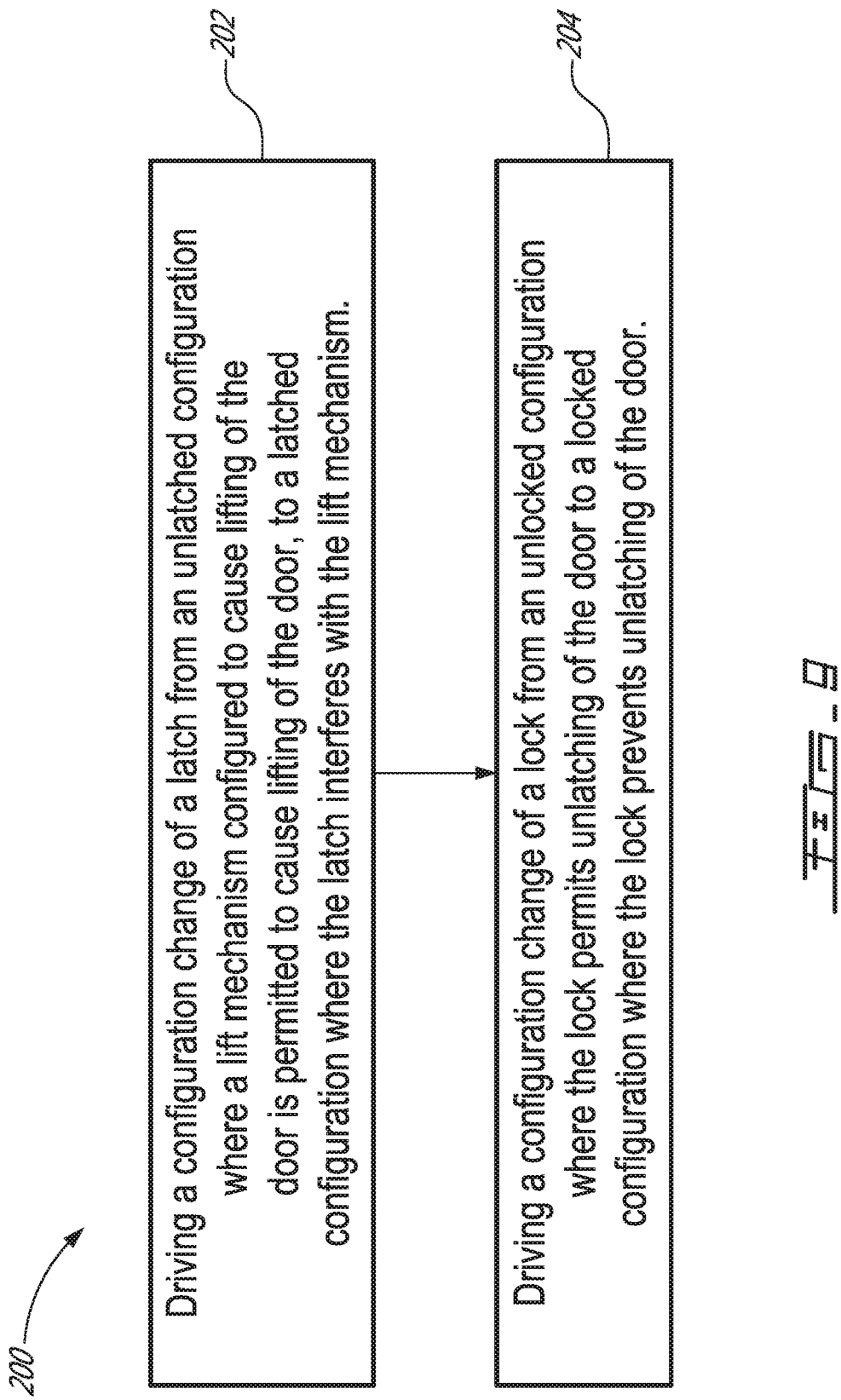

SYSTEM FOR LATCHING AND LOCKING AN AIRCRAFT DOOR

CROSS REFERENCE TO RELATED APPLICATION AND CLAIM OF PRIORITY

This application relies for priority on U.S. Provisional Patent Application Ser. No. 62/776,730 filed on Dec. 7, 2018, the entire content of which is incorporated herein by reference.

TECHNICAL FIELD

The disclosure relates generally to aircraft, and more particularly to aircraft doors.

BACKGROUND

Aircraft doors include latching elements that are configured to take loads during flight. Aircraft doors also include a lock that prevents the latching elements from unexpectedly becoming disengaged. Existing latching mechanisms include fittings that are mounted to the fuselage and that cooperate with mechanical elements on the door to achieve latching of the door. The fittings mounted to the fuselage must be properly adjusted (i.e., rigged) during manufacturing of each aircraft and such adjustments can be time consuming and expensive. Improvement is desirable.

SUMMARY

In one aspect, the disclosure describes a system for latching and locking an aircraft door. The system comprises:

a latch configurable between: a latched configuration where the latch interferes with a lift mechanism configured to cause lifting of the aircraft door to permit opening of the aircraft door; and an unlatched configuration where the lift mechanism is permitted to cause lifting of the aircraft door; and a lock configurable between: a locked configuration where a configuration change of the latch from the latched configuration to the unlatched configuration is prevented; and an unlocked configuration where the configuration change of the latch from the latched configuration to the unlatched configuration is permitted.

The system may comprise a vent flap movable between an open position and a closed position. The vent flap may be drivingly coupled to the lock so that a movement of the vent flap drives a configuration change of the lock.

The system may comprise a handle drivingly coupled to the vent flap so that a movement of the handle drives a movement of the vent flap.

The handle may be drivingly coupled to the lift mechanism so that the movement of the handle drives the lifting of the aircraft door.

The handle may be drivingly coupled to the latch so that the movement of the handle drives the configuration change of the latch.

The latch may include a rotatable latch shaft. The lock may be a primary lock. The system may include a secondary lock configured to interfere with a rotation of the latch shaft when the secondary lock is in a locked configuration. The secondary lock may include a rotatable yoke drivingly coupled to the vent flap so that a rotation of the yoke drives the movement of the vent flap.

The system may comprise a handle and a rotatable handle shaft drivingly couple to the handle so that a movement of the handle causes a rotation of the handle shaft. The handle shaft may be drivingly coupled to the vent flap so that the rotation of the handle shaft drives the movement of the vent flap.

The system may comprise a yoke rotatable about a rotation axis that is different from a rotation axis of the handle shaft. The handle shaft may be drivingly coupled to the yoke so that the rotation of the handle shaft drives a rotation of the yoke. The rotation of the yoke may drive the movement of the vent flap.

The yoke may be drivingly coupled to the vent flap via a first link. The vent flap may be drivingly coupled to the lock via a second link.

The latch may include a rotatable latch shaft. The handle shaft may be drivingly coupled to the latch shaft via a third link.

The latch may interfere with a rotation of a lift shaft of the lift mechanism when the latch is in the latched configuration. The latch shaft may permit the rotation of the lift shaft when the latch is in the unlatched configuration.

The latch may interfere with a rotation of a lift pawl attached to the lift shaft when the latch is in the latched configuration.

The latch may include a rotatable latch shaft and a first latch pawl attached to the latch shaft and rotatable with the latch shaft. The first latch pawl may be configured to interfere with the rotation of the lift pawl.

The latch may include a second latch pawl attached to the latch shaft and rotatable with the latch shaft. The lock may be configured to interfere with a rotation of the second latch pawl when the lock is in the locked configuration.

The lock may be a primary lock. The system may include a secondary lock configured to interfere with a rotation of the first latch pawl when the secondary lock is in a locked configuration.

The lock may include a rotatable lock pawl configured to interfere with the rotation of the second latch pawl.

Embodiments can include combinations of the above features.

In another aspect, the disclosure describes an aircraft door comprising a system as described herein.

In another aspect, the disclosure describes an aircraft comprising a system as described herein.

In another aspect, the disclosure describes a method for unlocking and unlatching an aircraft door. The method comprises:

when the aircraft door is latched and locked in a closed and a lowered position, driving a configuration change of a lock from a locked configuration where the lock prevents unlatching of the aircraft door to an unlocked configuration where the lock permits unlatching of the aircraft door; and when the lock is in the unlocked configuration, driving a configuration change of a latch from a latched configuration where the latch interferes with a lift mechanism configured to cause lifting of the aircraft door to permit opening of the aircraft door, to an unlatched configuration where the lift mechanism is permitted to cause lifting of the aircraft door.

The method may comprise using an opening movement of a vent flap of the aircraft door to drive the configuration change of the lock.

The method may comprise using a movement of a handle to drive the opening movement of the vent flap.

The method may comprise using the movement of the handle to drive the lifting of the aircraft door from the lowered position.

The method may comprise using the movement of the handle to drive the configuration change of the latch.

The lock may be a primary lock and the method may include driving a configuration change of a secondary lock from a locked configuration where the secondary lock prevents unlatching of the aircraft door to an unlocked configuration where the secondary lock permits unlatching of the aircraft door.

The latch may interfere with a rotation of a lift shaft of the lift mechanism when the latch is in the latched configuration. The latch may permit rotation of the lift shaft when the latch is in the unlatched configuration.

The lock may interfere with a rotation of a latch shaft of the latch when the lock is in the locked configuration. The lock may permit rotation of the latch shaft when the lock is in the unlocked configuration.

Embodiments can include combinations of the above features.

In a further aspect, the disclosure describes a method for latching and locking an aircraft door. The method comprises:

when the aircraft door is unlatched and unlocked in a closed and a lowered position, driving a configuration change of a latch from an unlatched configuration where a lift mechanism configured to cause lifting of the aircraft door to permit opening of the aircraft door is permitted to cause lifting of the aircraft door, to a latched configuration where the latch interferes with the lift mechanism; and when the latch is in the latched configuration, driving a configuration change of a lock from an unlocked configuration where the lock permits unlatching of the aircraft door to a locked configuration where the lock prevents unlatching of the aircraft door.

The method may comprise using a closing movement of a vent flap of the aircraft door to drive the configuration change of the lock.

The method may comprise using a movement of a handle to drive the closing movement of the vent flap.

The method may comprise using the movement of the handle to drive the configuration change of the latch.

The lock may be a primary lock and the method may include driving a configuration change of a secondary lock from an unlocked configuration where the secondary lock permits unlatching of the aircraft door to a locked configuration where the secondary lock prevents unlatching of the aircraft door.

The latch may interfere with a rotation of a lift shaft of the lift mechanism when the latch is in the latched configuration. The latch may permit rotation of the lift shaft when the latch is in the unlatched configuration.

The lock may interfere with a rotation of a latch shaft of the latch when the lock is in the locked configuration. The lock may permit rotation of the latch shaft when the lock is in the unlocked configuration.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a top plan view of an exemplary aircraft comprising a system for latching and locking an aircraft door as described herein;

FIG. 2 is a perspective view of a portion of a fuselage of the aircraft of FIG. 1 with an exemplary door in the open position;

FIG. 3 is a perspective view of the door of FIG. 2 when the door is in the closed position showing the system for latching and locking the door;

FIG. 4A is an enlarged perspective view of part of the system of FIG. 3;

FIG. 6B is a another side view of part of the system of FIG. 4A in a configuration where the door is latched and unlocked;

FIG. 6C is another side view of the part of the system of FIG. 4A in a configuration where the door is unlocked and unlatched;

FIG. 7 is another side view of the part of the system of FIG. 4A illustrating a failure case where the door remains latched;

FIG. 8 is a flowchart of a method for unlocking and unlatching an aircraft door; and FIG. 9 is a flowchart of a method for latching and locking an aircraft door.

DETAILED DESCRIPTION

Figure 4B:
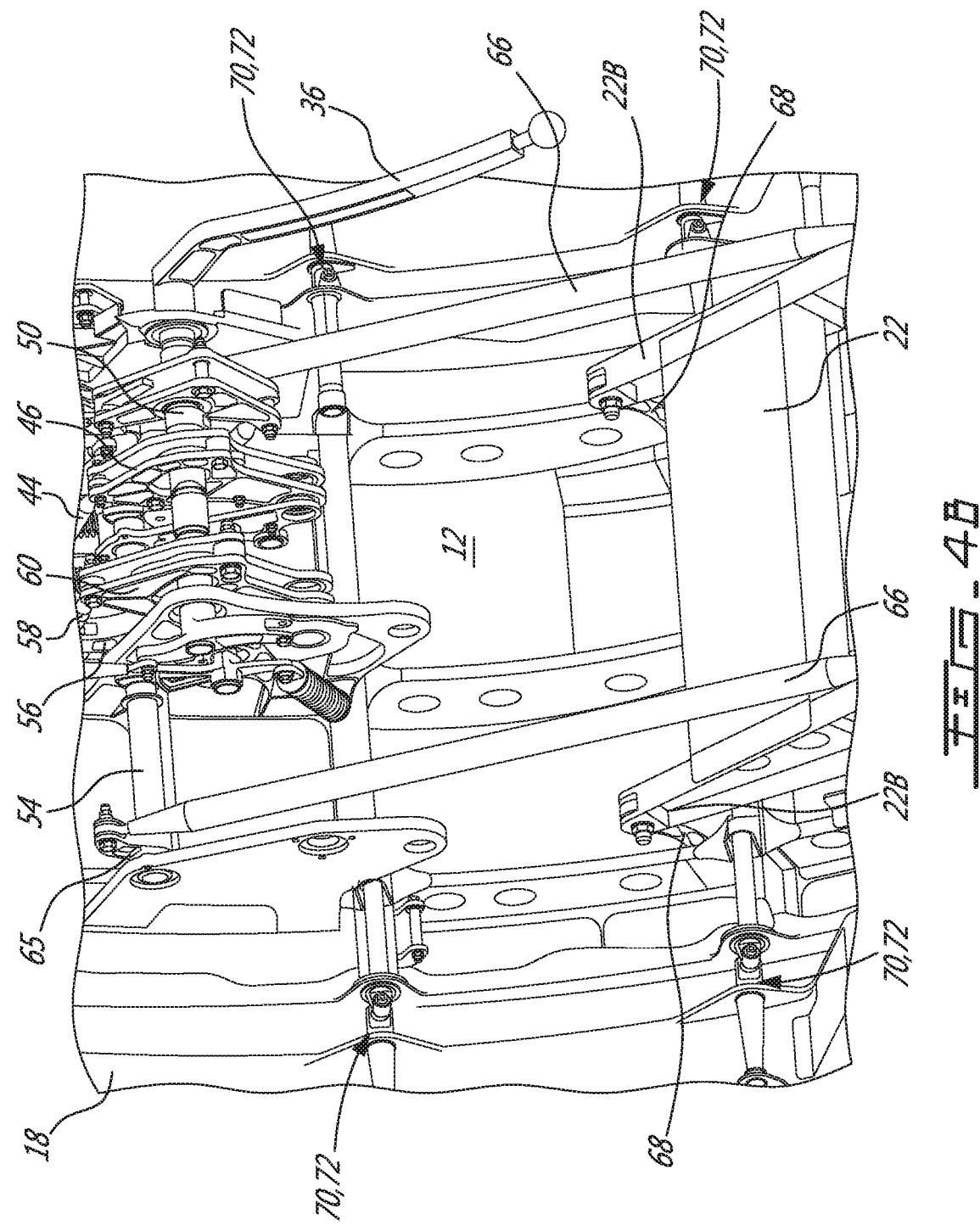
FIG. 4B is an enlarged perspective view of another part of the system of FIG. 3.

In various embodiments, the (e.g., latching and locking) systems and methods described herein can improve the construction and operation of passenger doors of aircraft. For example, the systems disclosed herein can, in some embodiments, reduce or eliminate the need for latch fittings mounted to the fuselage door surround and consequently reduce the amount of adjustment/rigging of doors during manufacturing of aircraft. In some embodiments, flight loads can be transferred to the fuselage via a hinge of the door instead of such other latch fittings mounted to the fuselage. In some embodiments, the systems disclosed herein can facilitate assembly since the mechanisms can be assembled as one or more separate sub-assemblies before being incorporated in the door structure. This can simplify the door assembly or disassembly sequence and in-service maintenance.

In some embodiments, the systems disclosed herein can be used with "semi-plug" type doors that include an airstair and that require lifting during an initial opening stage of the door in order to permit door pressure stops on the door to move past corresponding fuselage pressure stops on the fuselage and consequently permit opening of the door. As explained further below, the door pressure stops on the door rest against fuselage pressure stops on the fuselage and the pressure differential between the interior and exterior of the aircraft securely holds the door pressure stops against the fuselage pressure stops so that, in the event of a failure of a latching mechanism of the door during flight, the pressurization of the aircraft would hold the door in place.

Aspects of various embodiments are described through reference to the drawings.

FIG. 1 is a top plan view of an exemplary aircraft 10 which can comprise passenger door 12 with integrated stairs (i.e., an airstair). Aircraft 10 can be a fixed-wing aircraft comprising one or more engines 14. Aircraft 10 can comprise wings 16, fuselage 18 and empennage 20. Aircraft 10 can be any type of aircraft such as corporate, private, commercial and passenger aircraft suitable for civil aviation.

For example, aircraft 10 can be a (e.g., ultra-long range) business jet, a twin-engine turboprop airliner or a regional jet airliner.

FIG. 2 is a perspective view of a portion of fuselage 18 with door 12 of aircraft 10 shown in an open position. Door 12 can be a clamshell type door. Door 12 can be a "semi-plug" type door that requires lifting to permit opening of door 12. Door 12 can be pivotally coupled to fuselage 18 of aircraft 10 via hinge 22 disposed at a lower portion of opening 24 formed into fuselage 18. Door 12 can have an interior side facing an interior (e.g., passenger cabin) of aircraft 10 when door 12 is closed and an exterior side (e.g., outer skin) facing an exterior of aircraft 10 when door 12 is closed. The interior side of door 12 can define airstair 26 permitting passengers to board and exit aircraft 10 when door 12 is open. Airstair 26 can include one or more steps. Aircraft 10 can include a deployable handrail 28 associated with airstair 26. Handrail 28 can be movable between a stowed configuration when door 12 is closed to a deployed configuration when door 12 is open. The movement of handrail 28 can be coordinated with the opening/closing movement (e.g., rotation) of door 12.

In some embodiments, door 12 can be configured so that the opening and closing of door 12 can be initiated manually either by the flight crew from the interior of aircraft 10 or by the ground crew from the exterior of aircraft 10. In some embodiments door 12 can be coupled to an assist mechanism configured to reduce an amount of force required to manually move door 12 between its open and closed positions. In some embodiments, door 12 can be operatively coupled to one or more electric motors that can facilitate the opening and/or closing of door 12 for example. Such motor(s) can be mounted to fuselage 18 and drivingly coupled to door 12 via cable(s) 30 and pulley(s).

FIG. 3 is a perspective view of door 12 and hinge 22 when door 12 is in the closed position showing system 32 for latching and locking of door 12. Airstair 26 is not shown in FIG. 3 in order to expose system 32 which can be disposed inside airstair 26 and substantially hidden from view. Hinge 22 can include first end 22A for pivotally coupling to fuselage 18 and second end 22B for pivotally coupling to door 12. Hinge 22 and door 12 can be rotatable about rotation axis A1 relative to fuselage 18. System 32 can include vent flap 34 movable between an open position and a closed position. Vent flap 34 can serve to equalize pressure on both sides of door 12 before opening door 12. Therefore, vent flap 34 can be configured to open before door 12 can be opened. Vent flap 34 can also prevent pressurization of a cabin of aircraft 12 in case of a failure of system 32 that would result in vent flap 34 not being properly closed.

FIGS. 4A and 4B are enlarged perspective views of parts of system 32. System 32 can include (e.g., internal) handle 36 configured to facilitate opening and closing of door 12. During an opening of door 12, handle 36 can serve to cause unlocking, unlatching and lifting of door 12. During a closing of door 12, handle 36 can serve to cause lowering, latching and locking of door 12. Lowering and lifting of door 12 can be carried out via lift mechanism 38 described further below. Latching and unlatching of door 12 can be carried out via latch 40 (shown in FIGS. 6A-6B) described further below. Locking and unlocking of door 12 can be carried out via lock 42 (shown in FIGS. 6A-6B) described further below.

Handle 36 can be drivingly coupled to vent flap 34 so that a movement of handle 36 drives a movement of vent flap 34. For example, vent flap 34 can be operatively coupled to handle 36 via flap command link 44, flap command yoke 46, flap command cam 48 and handle shaft 50. Actuation (e.g., rotation) of handle 36 by the flight crew of aircraft 10 for example can drive a rotation of handle shaft 50 about rotation axis A2. Flap command cam 48 can be attached to handle shaft 50 for common rotation with handle shaft 50. Flap command cam 48 can define a camming surface that is configured to engage one or more rollers 52 (i.e., followers) that are rotatably attached to flap command yoke 46. The movement of rollers 52 induced via flap command cam 48 can drive a rotational movement of flap command yoke 46 about rotation axis A3. In turn, the rotation of flap command yoke 46 can then drive a movement (e.g., translation) of flap command link 44, which drives the movement of vent flap 34 to either open or close vent flap 34 depending on the direction of movement of handle 36. Flap command link 44 can have a first end pivotally coupled to flap command yoke 46 and a second end pivotally coupled (e.g., directly or indirectly) to vent flap 34. Rotation axis A2 of handle shaft 50 can be different from rotation axis A3 of flap command yoke 46. In some embodiments, rotation axis A2 of handle shaft 50 and rotation axis A3 of flap command yoke 46 can be substantially parallel and spaced apart from each other. Handle shaft 50 can be rotatably supported by door 12.

In some embodiments, system 32 can be configured to prevent vent flap 34 from getting closed unless door 12 is properly latched and locked. This can prevent pressurization of the aircraft cabin if door 12 is not properly latched and locked. Door 12 can comprise other mechanisms and components that have been omitted from the figures for clarity.

Handle 36 can be drivingly coupled to lift mechanism 38 so that movement of handle 36 drives the lifting of door 12. Lift mechanism 38 can include a plurality of components working together to perform a lifting function of door 12. For example, lift shaft 54 can be operatively coupled to handle 36 via crank 56, lift command link 58, lift command yoke 60, lift command cam 62 and handle shaft 50. Lift command cam 62 can be attached to handle shaft 50 for common rotation with handle shaft 50. Lift command cam 62 can define a camming surface that is configured to engage one or more rollers 64 (i.e., followers) that are rotatably attached to lift command yoke 60. The movement of rollers 64 induced via lift command cam 62 can drive a rotational movement of lift command yoke 60 about rotation axis A3. In turn, the rotation of lift command yoke 60 can then drive a movement (e.g., translation) lift command link 58, which drives a movement of crank 56 to drive a rotation of lift shaft 54 to either cause lifting or lowering of door 12 depending on the direction of movement of handle 36. Lift command link 58 can have a first end pivotally coupled to lift command yoke 60 and a second end pivotally coupled to crank 56. Crank 56 can be attached to lift shaft 54 for common rotation with lift shaft 54.

Lift shaft 54 can have rotation axis A4 which can be different from rotation axis A2 of handle shaft 50. Rotation axis A4 of lift shaft 54 can also be different from rotation axis A3 of of flap command yoke 46. In some embodiments, rotation axis A4 of lift shaft 54 and rotation axis A2 of handle shaft 50 can be substantially parallel and spaced apart from each other. Lift shaft 54 can be rotatably supported by door 12.

Lift mechanism 38 can include one or more cranks 65 that are attached to lift shaft 54 for common rotation with lift shaft 54. Cranks 65 can be drivingly coupled to respective lift rods 66. Lift rods 66 can each have a first end that is pivotally coupled to a respective crank 65 and a second end that is pivotally coupled to hinge 22. Accordingly, rotation of cranks 65 with lift shaft 54 can drive a movement (e.g., translation) of lift rods 66 and thereby drive a lifting movement of door 12 relative to hinge 22. Second end 22B of hinge 22 can be coupled to door 12 via one or more links 68. For example each link 68 can have a first end pivotally coupled to hinge 22 and a second end pivotally coupled to a structure of door 12. Accordingly, the actuation of lift rods 66 can cause a lifting movement of door 12 relative to hinge 22 by way of rotation of links 68.

Figure 5A:
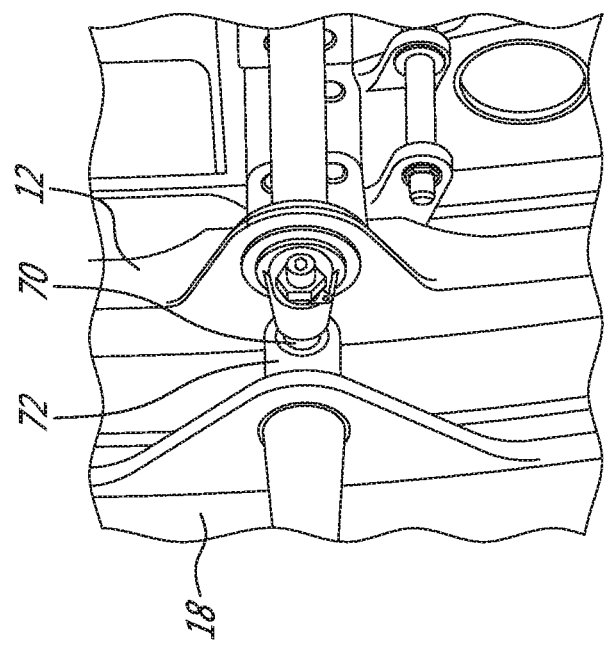
FIGS. 5A and 5B are perspective views of a portion of the door and of the fuselage of the aircraft when the door is lowered and when the door is lifted respectively.
Figure 5B:
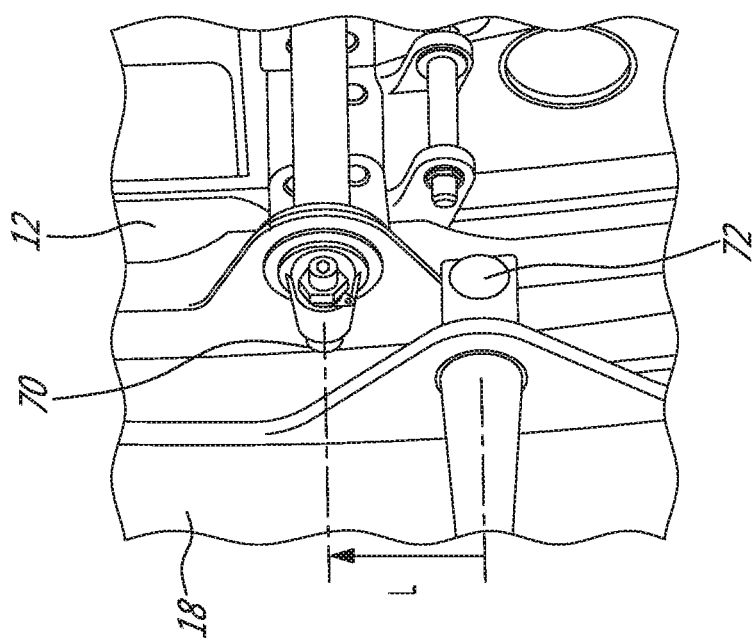

FIGS. 5A and 5B are perspective views of a portion of door 12 and fuselage 18 when door 12 is lowered and when door 12 is lifted respectively. FIG. 5B shows door 12 being lifted by amount L. FIGS. 5A and 5B are from a vantage point that is inside of aircraft 10. As explained above, door 12 can be a "semi-plug" type door that requires lifting during an initial opening stage in order to permit door pressure stops 70 attached to door 12 to clear and move past corresponding fuselage pressure stops 72 attached to fuselage 18 and consequently permit opening of door 12. When door 12 is closed and lowered, door pressure stops 70 and fuselage pressure stops 72 are aligned so that door pressure stops 70 rest against fuselage pressure stops 72 and the pressure differential between the interior and exterior of aircraft 10 causes door 12 to be securely held via door pressure stops 70 and fuselage pressure stops 72. When door 12 is lifted, door pressure stops 70 and fuselage pressure stops 72 are offset from each other so that door pressure stops 70 clear fuselage pressure stops 72 and are free to move outwardly from fuselage 18 so that door 12 can then be opened by pivotal movement of door 12 about axis A1 (see FIG. 3). In some embodiments, a plurality of door pressure stops 70 and corresponding fuselage pressure stops 72 can be distributed around door 12.

Figure 6A:
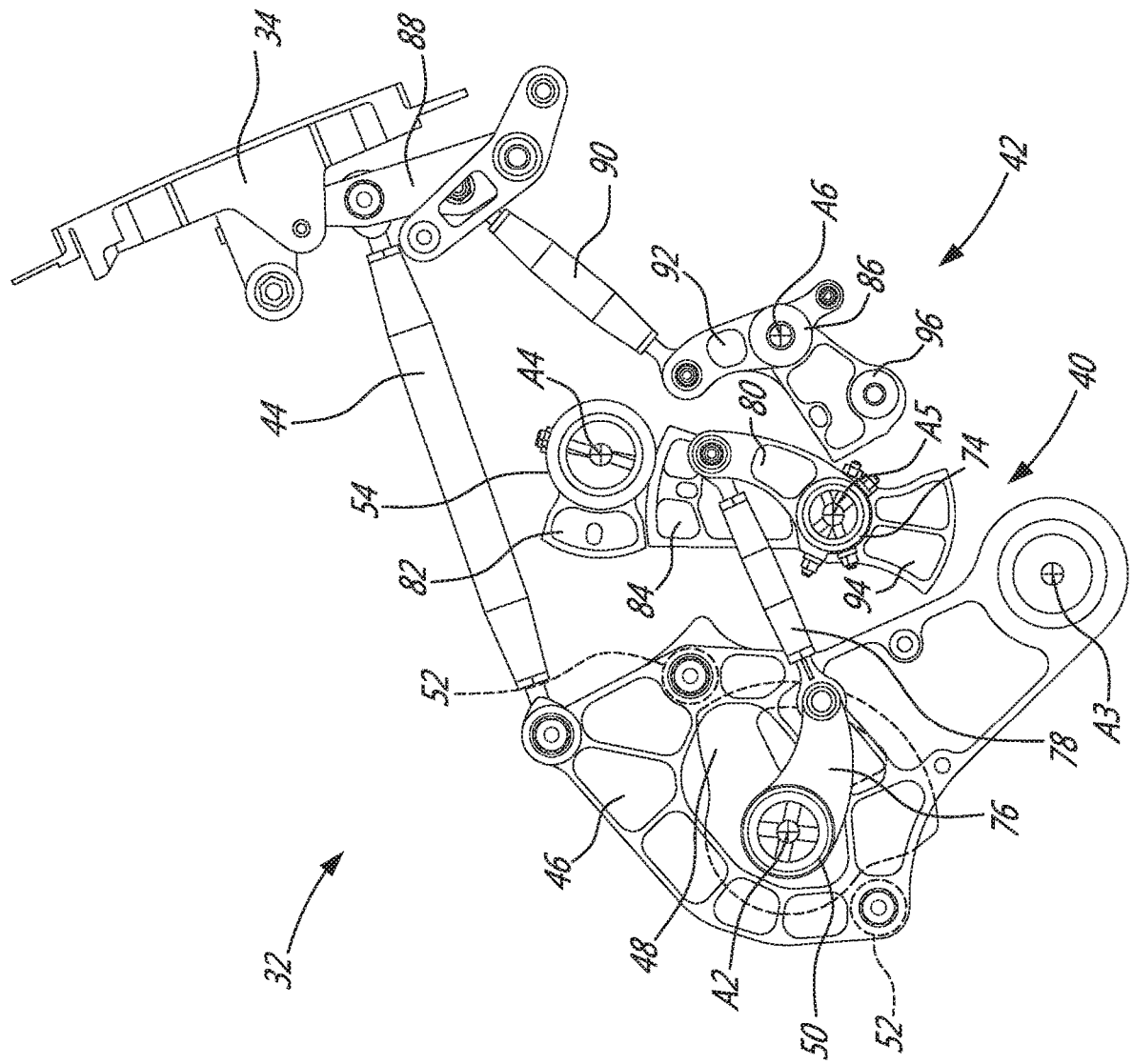
FIG. 6A is a side view of part of the system of FIG. 4A in a configuration where the door is latched and locked.

FIG. 6A is a side view of part of system 32 in a configuration where door 12 is closed, latched and locked. The configuration shown in FIG. 6A corresponds to handle 36 being at a first position. Latch 40 can include one or more movable mechanical elements that, when engaged, prevent door 12 from opening. Latch 40 can include a mechanism to cause latching of door 12. Latch 40 can be configurable between a latched (i.e., engaged) configuration shown in FIG. 6A and an unlatched configuration shown in FIG. 6C. In the latched configuration, latch 40 can prevent lift mechanism 38 from causing lifting of door 12. In some embodiments, latch 40 can interfere with the operation of lift mechanism 38 and inhibit lift mechanism 38 from causing lifting of door 12.

Latch 40 can include rotatable latch shaft 74 that is drivingly coupled to handle 36 via handle shaft 50, crank 76, latch command link 78 and crank 80. Crank 76 can be attached to handle shaft 50 so that rotation of handle shaft 50 drives a rotation of crank 76. Crank 80 can be attached to latch shaft 74 so that rotation of crank 80 about rotation axis A5 causes rotation of latch shaft 74. Latch command link 78 can have a first end pivotally coupled to crank 76 and a second end pivotally coupled to crank 80 so that movement of crank 76 induces a movement of latch command link 78 and the movement of latch command link 78 induces the rotation of crank 80. Accordingly, movement of handle 36 can drive a configuration change of latch 40.

Latch 40 can interfere with the rotation of lift shaft 54 of lift mechanism 38 when latch 40 is in the latched configuration. Lift mechanism 38 can include one or more (e.g., two) lift pawls 82 (referred hereinafter in the singular) attached to lift shaft 54 and rotatable with lift shaft 54. Latch 40 can include one or more (e.g., two) corresponding first latch pawls 84 (referred hereinafter in the singular) attached to latch shaft 74 and rotatable with latch shaft 74. In the latched configuration shown in FIG. 6A, first latch pawl 84 can interfere with the rotation of lift pawl 82 and consequently interfere with the rotation of lift shaft 54 in the counter-clockwise direction as viewed in FIG. 6A. Preventing the rotation of lift shaft 54 can consequently prevent lift mechanism 38 from causing lifting of door 12 when latch 40 is in the latched configuration. In this configuration, flight loads transferred to lift shaft 54 and urging lift shaft 54 to rotate in the counter-clockwise direction is blocked by latch pawl 84 in a way that urges latch shaft 74 in the over-latching (e.g., clockwise) direction instead of in the unlatching (e.g., counter-clockwise) direction.

Lock 42 can include one or more mechanical elements that can monitor the configuration of latch 40 and, when engaged, prevent latch 40 from adopting the unlatched configuration. Lock 42 can include a mechanism for causing locking of door 12. Lock 42 can be configurable between a locked (i.e., engaged) configuration shown in FIG. 6A and an unlocked configuration shown in FIG. 6C. In the locked configuration, lock 42 can prevent a configuration change of latch 40 from the latched configuration to the unlatched configuration. Lock 42 can include rotatable lock shaft 86 that is drivingly coupled to handle 36 via handle shaft 50, flap command yoke 46, flap command link 44, bar 88, lock command link 90 and crank 82. Flap command yoke 46 can be drivingly coupled to handle shaft 50 and be rotatable about axis A3 as explained above. Flap command link 44 can be drivingly coupled to vent flap 34 via bar 88 so that the movement of flap command link 44 drives the opening or closing movement of vent flap 34. Crank 92 can be attached to lock shaft 86 so that a rotation of crank 92 about rotation axis A6 causes a rotation of lock shaft 86. Lock command link 90 can have a first end pivotally coupled to crank 92 and a second end pivotally coupled to 88 so that the movement of vent flap 34 drives (e.g., via bar 88) a movement of lock command link 90 and the movement of lock command link 90 drives the rotation of crank 92 and lock shaft 86. Accordingly, the movement of vent flap 34 can drive a configuration change of lock 42.

Latch 40 can include second latch pawl 94 attached to latch shaft 74 and rotatable with latch shaft 74. Lock 42 can include rotatable lock pawl 96 configured to interfere with the rotation of second latch pawl 94 and consequently interfere with the rotation of latch shaft 74 in the counter-clockwise direction as viewed in FIG. 6A. In other words, latch 40 can prevent the lifting of door 12 via lift mechanism 38 (see FIG. 3) and lock 42 can prevent latch 40 from adopting the unlatched configuration.

FIG. 6B is another side view of part of system 32 in a configuration where door 12 is closed, latched but unlocked. The configuration shown in FIG. 6B corresponds to handle 36 having been moved (e.g., rotated in the clockwise direction) from the first position to a second position. Clockwise rotation R50 of handle shaft 50 has caused an opening movement of vent flap 34 via flap command cam 48, rollers 52, flap command yoke 46, flap command link 44 and bar 88. The movement of vent flap 34 has caused a counter-clockwise rotation R86 of lock shaft 86 via bar 88, lock command link 90 and crank 92. Clockwise rotation R50 of handle shaft 50 has also caused a counter-clockwise rotation R74 of latch shaft 74 via crank 76, latch command link 78 and crank 80.

FIG. 6B illustrates a configuration where: vent flap 34 has undergone some opening movement; first latch pawl 84 of latch 40 still interferes with counter-clockwise rotation of lift pawl 82 of lift mechanism 38; and lock pawl 96 has rotated to a position wherein lock pawl 96 no longer interferes with the counter-clockwise rotation R74 of second latch pawl 94.

FIG. 6C is another side view of part of system 32 in a configuration where door 12 is unlatched, unlocked and ready to be lifted using lift mechanism 38. The configuration shown in FIG. 6C corresponds to handle 36 having been moved (e.g., further rotated in the clockwise direction) from the second position to a third position. Clockwise rotation R50 of handle shaft 50 has caused further opening movement of vent flap 34. The further movement of vent flap 34 has caused further counter-clockwise rotation R86 of lock shaft 86. Clockwise rotation R50 of handle shaft 50 has also caused further counter-clockwise rotation R74 of latch shaft 74. FIG. 6C illustrates a configuration where: first latch pawl 84 of latch 40 no longer interferes with counter-clockwise rotation of lift pawl 82 of lift mechanism 38; and lock pawl 96 also no longer interferes with the counter-clockwise rotation of second latch pawl 94. In this unlocked and unlatched configuration of system 32, lift shaft 54 can be driven to rotate (e.g., see rotation R54) counter-clockwise by further movement of handle 36 in order to cause lifting of door 12 in preparation for opening door 12.

In this unlatched configuration of latch 40, lock 42 can be prevented from returning to the locked configuration. For example, second latch pawl 94 of latch 40 is positioned to interfere with lock pawl 96 in case of clockwise rotation of lock shaft 86.

In some embodiments, the actuation of handle 36 can drive various functions associated with door 12 via system 32. The timing and sequencing of such functions can be implemented via cams, yokes and cranks or other methods. For example, starting from the first handle position (e.g., 0% travel) corresponding to door 12 being closed, latched and locked, actuation of handle 36 can drive the following sequential actions: opening of vent flap (e.g., at around 24% travel); unlocking of door 12 (e.g., at around 28% travel); unlatching of door 12 (e.g., at around 33% travel); lifting door 12 (e.g., from around 35% travel to around 90%); and completing the opening of door 12 (e.g., at around 100% travel). It is understood that in some embodiments of system 32, actuation of handle 36 in a reverse direction could drive some or all of the above actions in the reverse order to execute a closing sequence of door 12.

FIG. 7 is another side view of the part of system 32 illustrating a failure case where door 12 remains latched in the event of failure. In case of latch 40 becoming drivingly uncoupled from handle 36 due to a failure of latch command link 78 for example while door 12 is closed, latched and locked, latch 40 would be prevented from independently and unexpectedly adopting the unlatched configuration. In this situation, lock 42 can serve as a first (e.g., primary) lock where lock pawl 96 interferes with the movement of second latch pawl 94 to interfere (e.g., impose a limit on) counter-clockwise rotation R74 of latch shaft 74. Portion 98 of flap command yoke 46 can serve as a second (e.g., secondary) lock where portion 98 interferes with the movement of first latch pawl 84 to prevent (e.g., impose a limit on) counter-clockwise rotation R74 of latch shaft 74. Accordingly, lock pawl 96 and portion 98 can serve as hard stops that provide a dual-lock arrangement preventing latch 40 from independently and unexpectedly adopting the unlatched configuration in the event of a failure. FIG. 7 shows two instances of first latch pawl 84 and of second latch pawl 94 to illustrate the range of angular motion that is available to latch shaft 74 in this failure scenario.

FIG. 8 is a flowchart of method 100 for unlocking and unlatching aircraft door 12. Method 100 can be performed using system 32 described herein or other system. Aspects of method 100 can be combined with other methods or steps disclosed herein. In various embodiments, method 100 comprises:

when door 12 is latched and locked in a closed and a lowered position, driving a configuration change of lock 42 from a locked configuration where lock 42 prevents unlatching of door 12 to an unlocked configuration where lock 42 permits unlatching of door 12 (see block 102); and when lock 42 is in the unlocked configuration, driving a configuration change of latch 40 from a latched configuration where latch 40 interferes with lift mechanism 38 configured to cause lifting of door 12 to permit opening of door 12, to an unlatched configuration where lift mechanism 38 is permitted to cause lifting of door 12 (see block 104).

Method 100 can comprise using an opening movement of vent flap 34 of door 12 to drive the configuration change of lock 42 (e.g., via lock command link 90).

Method 100 can comprise using a movement of handle 36 to drive one or more of the following: the opening movement of vent flap 34 (e.g., via flap command link 44); lifting of door 12 from the lowered position (e.g., via lift command link 58); and the configuration change of latch 40 (e.g., via latch command link 78).

In some embodiments of method 100, lock 42 can be a primary lock and method 100 can include driving a configuration change of a secondary lock (e.g., portion 98) from a locked configuration where the secondary lock prevents unlatching of door 12 to an unlocked configuration where the secondary lock permits unlatching of door 12.

Latch 40 can interfere with the rotation of lift shaft 54 of lift mechanism 38 when latch 40 is in the latched configuration. Latch 40 can permit rotation of lift shaft 54 when latch 40 is in the unlatched configuration.

Lock 42 can interfere with the rotation of latch shaft 74 of latch 40 when lock 42 is in the locked configuration. Lock 42 can permit rotation of latch shaft 74 when lock 42 is in the locked configuration.

FIG. 9 is a flowchart of method 200 for latching and locking aircraft door 12. Method 200 can be performed using system 32 described herein or other system. Aspects of method 200 can be combined with other methods or steps disclosed herein. In various embodiments, method 200 comprises:

when door 12 is unlatched and unlocked in a closed and a lowered position, driving a configuration change of latch 40 from an unlatched configuration where lift mechanism 38 configured to cause lifting of door 12 is permitted to cause lifting of door 12, to a latched configuration where latch 40 interferes with lift mechanism 38 (see block 202); and when latch 40 is in the latched configuration, driving a configuration change of lock 42 from an unlocked configuration where lock 42 permits unlatching of door 12 to a locked configuration where lock 42 prevents unlatching of door 12 (see block 204).

Method 200 can comprise using a closing movement of vent flap 34 of door 12 to drive the configuration change of lock 42 (e.g., via lock command link 90).

Method 200 can comprise using a movement of handle 36 to drive one or more of the following: the closing movement of vent flap 34 (e.g., via flap command link 44); and the configuration change of latch 40 (e.g., via latch command link 78).

In some embodiments of method 200, lock 42 can be a primary lock and method 200 can include driving a configuration change of a secondary lock (e.g., portion 98) from an unlocked configuration where the secondary lock permits unlatching of door 12 to a locked configuration where the secondary lock prevents unlatching of door 12.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for latching and locking a semi-plug type aircraft door, the system comprising:
    a hinge pivotally coupling the aircraft door to a fuselage of an aircraft, said hinge being disposed at a lower portion of an opening of the fuselage;
    a latch configurable between: a latched configuration where the latch interferes with a lift mechanism configured to cause lifting of the aircraft door to permit opening of the aircraft door; and an unlatched configuration where the lift mechanism is permitted to cause lifting of the aircraft door, said lift mechanism comprising at least one crank attached to a lift shaft;
    a lock configurable between: a locked configuration where a configuration change of the latch from the latched configuration to the unlatched configuration is prevented; and an unlocked configuration where the configuration change of the latch from the latched configuration to the unlatched configuration is permitted;
    two lift rods, each lift rod having a respective first end coupled to the at least one crank and a respective second end coupled to the hinge;
    a vent flap movable between an open position and a closed position, the vent flap being drivingly coupled to the lock so that a movement of the vent flap drives a configuration change of the lock;
    a handle; and
    a rotatable handle shaft drivingly couple to the handle so that a movement of the handle causes a rotation of the handle shaft,
    wherein:
        the handle shaft is drivingly coupled to the vent flap so that the rotation of the handle shaft drives the movement of the vent flap;
        the lift mechanism, through rotation of the at least one crank with the lift shaft driving a movement of the lift rods, provides lifting during an initial opening stage in order to permit door pressure stops attached to the aircraft door to clear and move past corresponding fuselage pressure stops, such that the door pressure stops are free to move outwardly from the fuselage of the aircraft such that the aircraft door is openable by pivotal movement of the aircraft door;
        a clearance between the door pressure stops and the fuselage pressure stops during the initial opening stage is provided by a lifting motion of the aircraft door, and lowering of the aircraft door for closing thereof causes the door pressure stops and the fuselage pressure stops to align such that the door pressure stops rest against the fuselage pressure stops and a pressure differential between an interior and an exterior of the aircraft causes the aircraft door to be securely held via the door pressure stops and the fuselage pressure stops;
        the latch, the lock and the lift rods are disposed within an airstair on an interior side of the aircraft door;
        the handle is disposed on a side of the airstair and accessible to a flight crew;
        the handle is drivingly coupled to the lift mechanism and to the latch;
        actuation of the handle in a first direction drives the unlocking, the unlatching and the lifting of the aircraft door during opening of the aircraft door; and
        actuation of the handle in a second direction reverse to the first direction drives the lowering, the latching and the locking of the aircraft door during the closing of the aircraft door.

2. The system as defined in claim 1, wherein:
    the latch includes a rotatable latch shaft;
    the lock is a primary lock;
    the system includes a secondary lock configured to interfere with a rotation of the latch shaft when the secondary lock is in a locked configuration; and
    the secondary lock includes a rotatable yoke drivingly coupled to the vent flap so that a rotation of the yoke drives the movement of the vent flap.

3. The system as defined in claim 1, comprising a yoke rotatable about a rotation axis that is different from a rotation axis of the handle shaft, wherein:
    the handle shaft is drivingly coupled to the yoke so that the rotation of the handle shaft drives a rotation of the yoke; and
    the rotation of the yoke drives the movement of the vent flap.

4. The system as defined in claim 3, wherein:
    the yoke is drivingly coupled to the vent flap via a first link; and
    the vent flap is drivingly coupled to the lock via a second link.

5. The system as defined in claim 4, wherein:
    the latch includes a rotatable latch shaft; and
    the handle shaft is drivingly coupled to the latch shaft via a third link.

6. The system as defined in claim 1, wherein:
    the latch interferes with a rotation of the lift shaft of the lift mechanism when the latch is in the latched configuration; and
    the latch permits the rotation of the lift shaft when the latch is in the unlatched configuration.

7. The system as defined in claim 6, wherein the latch interferes with a rotation of a lift pawl attached to the lift shaft when the latch is in the latched configuration.

8. The system as defined in claim 7, wherein:
    the latch includes a rotatable latch shaft and a first latch pawl attached to the latch shaft and rotatable with the latch shaft; and
    the first latch pawl is configured to interfere with the rotation of the lift pawl.

9. The system as defined in claim 8, wherein:
    the latch includes a second latch pawl attached to the latch shaft and rotatable with the latch shaft; and
    the lock is configured to interfere with a rotation of the second latch pawl when the lock is in the locked configuration.

10. The system as defined in claim 9, wherein:
the lock is a primary lock; and
the system includes a secondary lock configured to interfere with a rotation of the first latch pawl when the secondary lock is in a locked configuration.

11. The system as defined in claim 9, wherein the lock includes a rotatable lock pawl configured to interfere with the rotation of the second latch pawl.

12. A method for unlocking and unlatching a semi-plug type aircraft door, the method comprising:
when the aircraft door is latched and locked in a closed and a lowered position, driving a configuration change of a lock from a locked configuration where the lock prevents unlatching of the aircraft door to an unlocked configuration where the lock permits unlatching of the aircraft door;
when the lock is in the unlocked configuration, driving a configuration change of a latch from a latched configuration where the latch interferes with a lift mechanism configured to cause lifting of the aircraft door to permit opening of the aircraft door, to an unlatched configuration where the lift mechanism is permitted to cause lifting of the aircraft door, said lift mechanism comprising at least one crank attached to a lift shaft, the at least one crank coupled to a respective first end of each of two lift rods;
using an opening movement of a vent flap of the aircraft door to drive the configuration change of the lock;
using a movement of a handle to cause a rotation of a handle shaft; and
using the rotation of the handle shaft to drive the opening movement of the vent flap,
wherein:
a hinge pivotally couples the aircraft door to a fuselage of an aircraft, said hinge being disposed at a lower portion of an opening of the fuselage, the hinge coupled to a respective second end of each of the two lift rods;
the lift mechanism, through rotation of the at least one crank with the lift shaft driving a movement of the lift rods, provides lifting during an initial opening stage in order to permit door pressure stops attached to the aircraft door to clear and move past corresponding fuselage pressure stops, such that the door pressure stops are free to move outwardly from the fuselage of the aircraft such that the aircraft door is openable by pivotal movement of the aircraft door;
a clearance between the door pressure stops and the fuselage pressure stops during the initial opening stage is provided by a lifting motion of the aircraft door, and lowering of the aircraft door for closing thereof causes the door pressure stops and the fuselage pressure stops to align such that the door pressure stops rest against the fuselage pressure stops and a pressure differential between an interior and an exterior of the aircraft causes the aircraft door to be securely held via the door pressure stops and the fuselage pressure stops;
the latch, the lock and the lift rods are disposed within an airstair on an interior side of the aircraft door;
the method includes actuating the handle to drive the unlocking, the unlatching and the lifting of the aircraft door during the opening of the aircraft door; and
the handle is disposed on a side of the airstair and accessible to a flight crew.

13. A method for latching and locking a semi-plug type aircraft door, the method comprising:
when the aircraft door is unlatched and unlocked in a closed and a lowered position, driving a configuration change of a latch from an unlatched configuration where a lift mechanism configured to cause lifting of the aircraft door to permit opening of the aircraft door is permitted to cause lifting of the aircraft door, to a latched configuration where the latch interferes with the lift mechanism, said lift mechanism comprising at least one crank attached to a lift shaft, the at least one crank coupled to a respective first end of each of two lift rods;
when the latch is in the latched configuration, driving a configuration change of a lock from an unlocked configuration where the lock permits unlatching of the aircraft door to a locked configuration where the lock prevents unlatching of the aircraft door; and
using a closing movement of a vent flap of the aircraft door to drive the configuration change of the lock;
using a movement of a handle to drive the closing movement of the vent flap,
wherein:
a hinge pivotally couples the aircraft door to a fuselage of an aircraft, said hinge being disposed at a lower portion of an opening of the fuselage, the hinge coupled to a respective second end of each of the two lift rods;
the lift mechanism, through rotation of the at least one crank with the lift shaft driving a movement of the lift rods, provides lifting during an initial opening stage in order to permit door pressure stops attached to the aircraft door to clear and move past corresponding fuselage pressure stops, such that the door pressure stops are free to move outwardly from the fuselage of the aircraft such that the aircraft door is openable by pivotal movement of the aircraft door;
a clearance between the door pressure stops and the fuselage pressure stops during the initial opening stage is provided by a lifting motion of the aircraft door, and lowering motion of the aircraft door for closing thereof causes the door pressure stops and the fuselage pressure stops to align such that the door pressure stops rest against the fuselage pressure stops and a pressure differential between an interior and an exterior of the aircraft causes the aircraft door to be securely held via the door pressure stops and the fuselage pressure stops;
the latch, the lock and the lift rods are disposed within an airstair on an interior side of the aircraft door;
the method includes actuating the handle to drive the lowering, the latching and the locking of the aircraft door during the closing of the aircraft door; and
the handle is disposed on a side of the airstair and accessible to a flight crew.

\* \* \* \* \*